Jan. 4, 1949.　　　　　H. B. COULTER　　　　　2,458,061
SLURRY MIXER

Filed July 12, 1947　　　　　　　　　　　5 Sheets-Sheet 1

INVENTOR
Harold B. Coulter,
BY
ATTORNEY

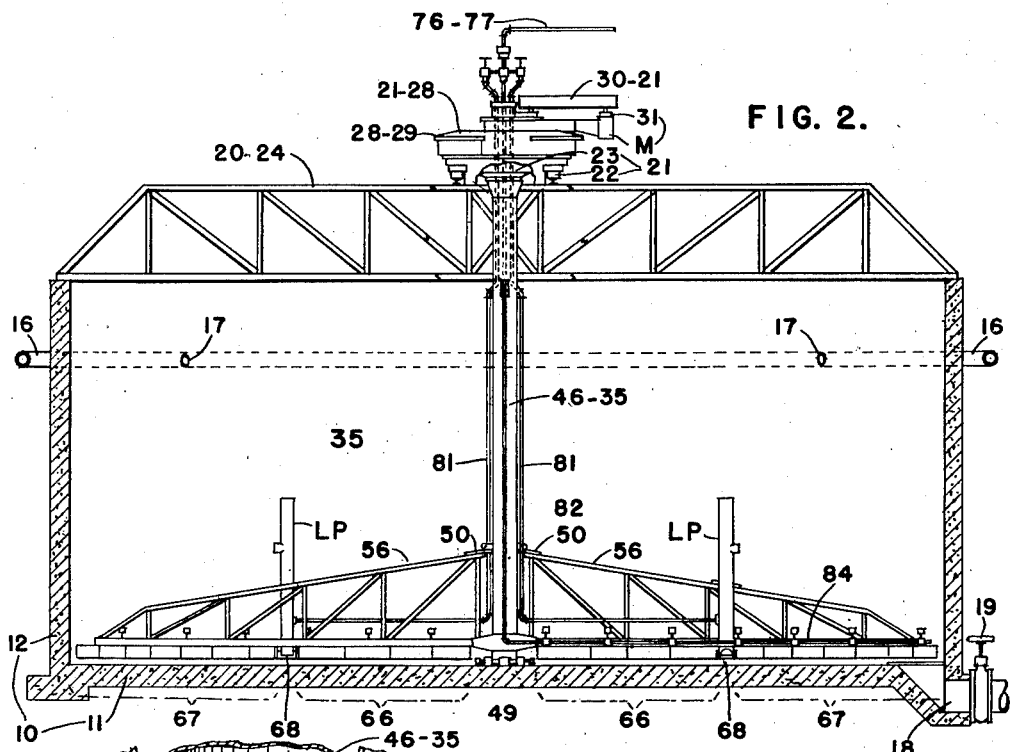
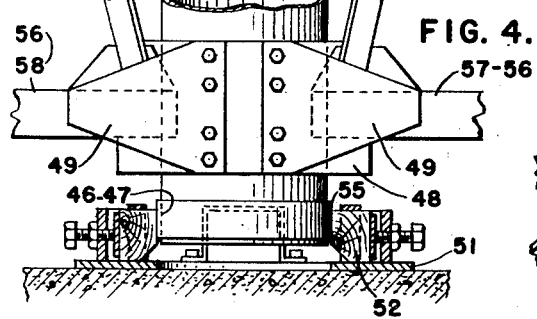
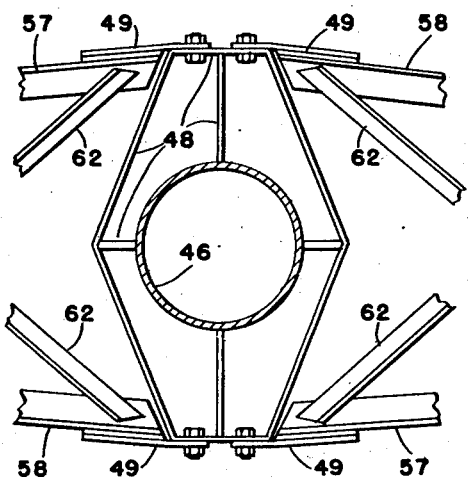
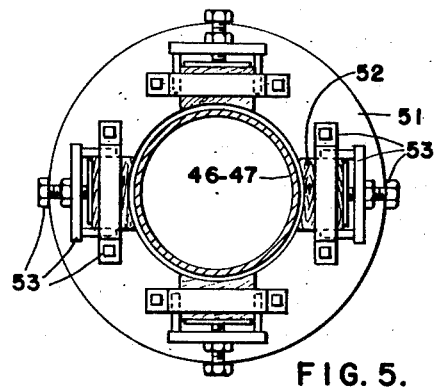

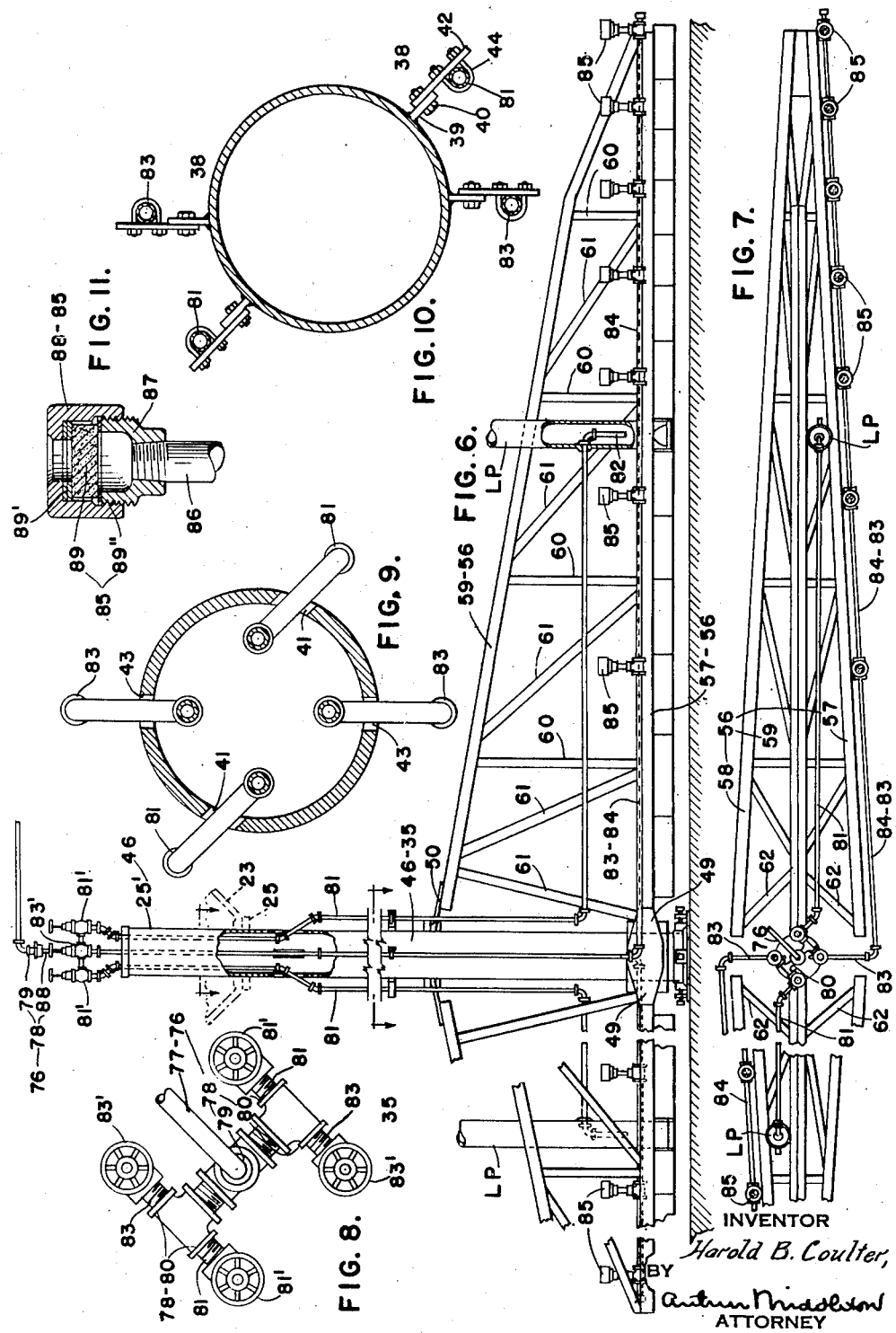

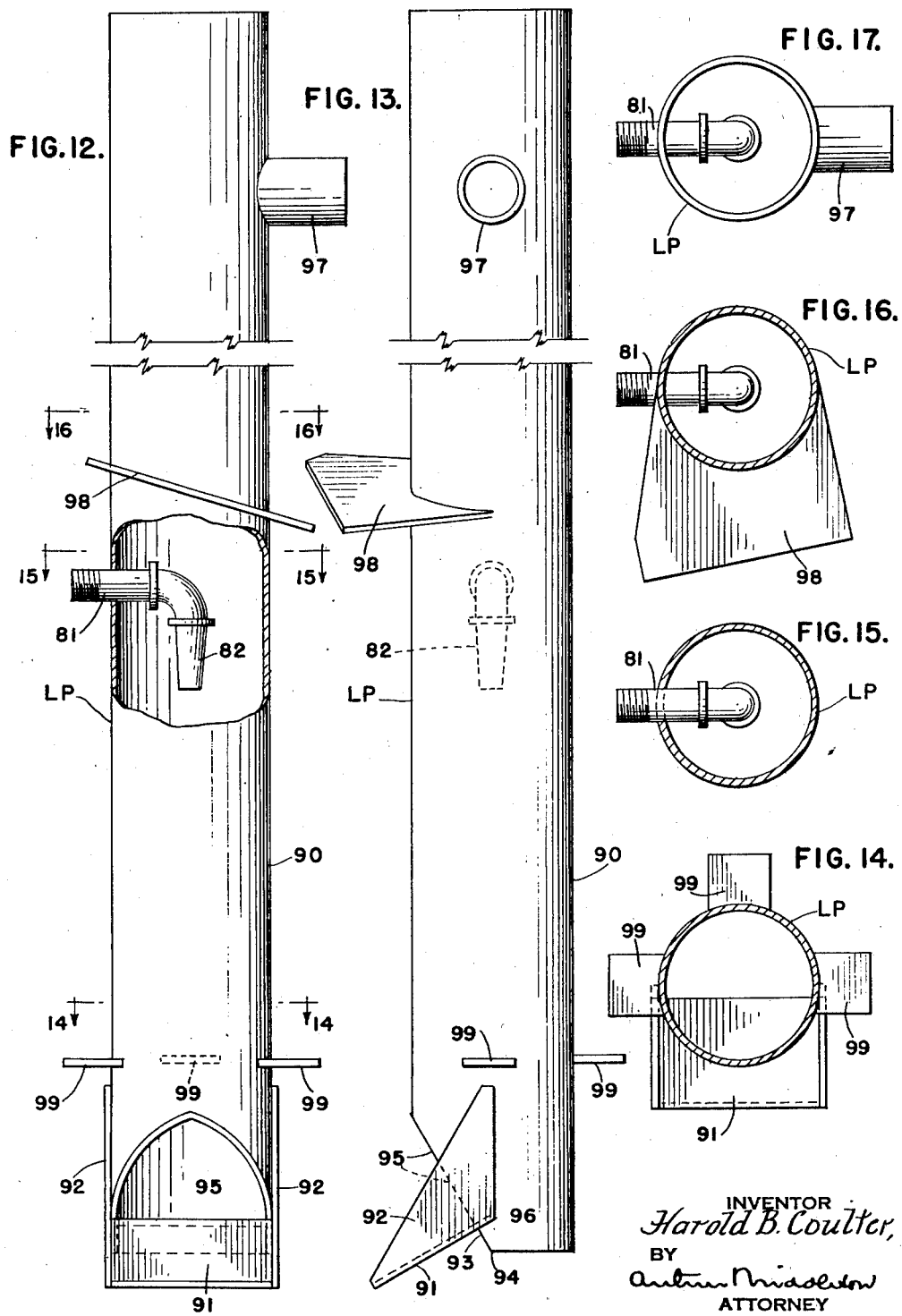

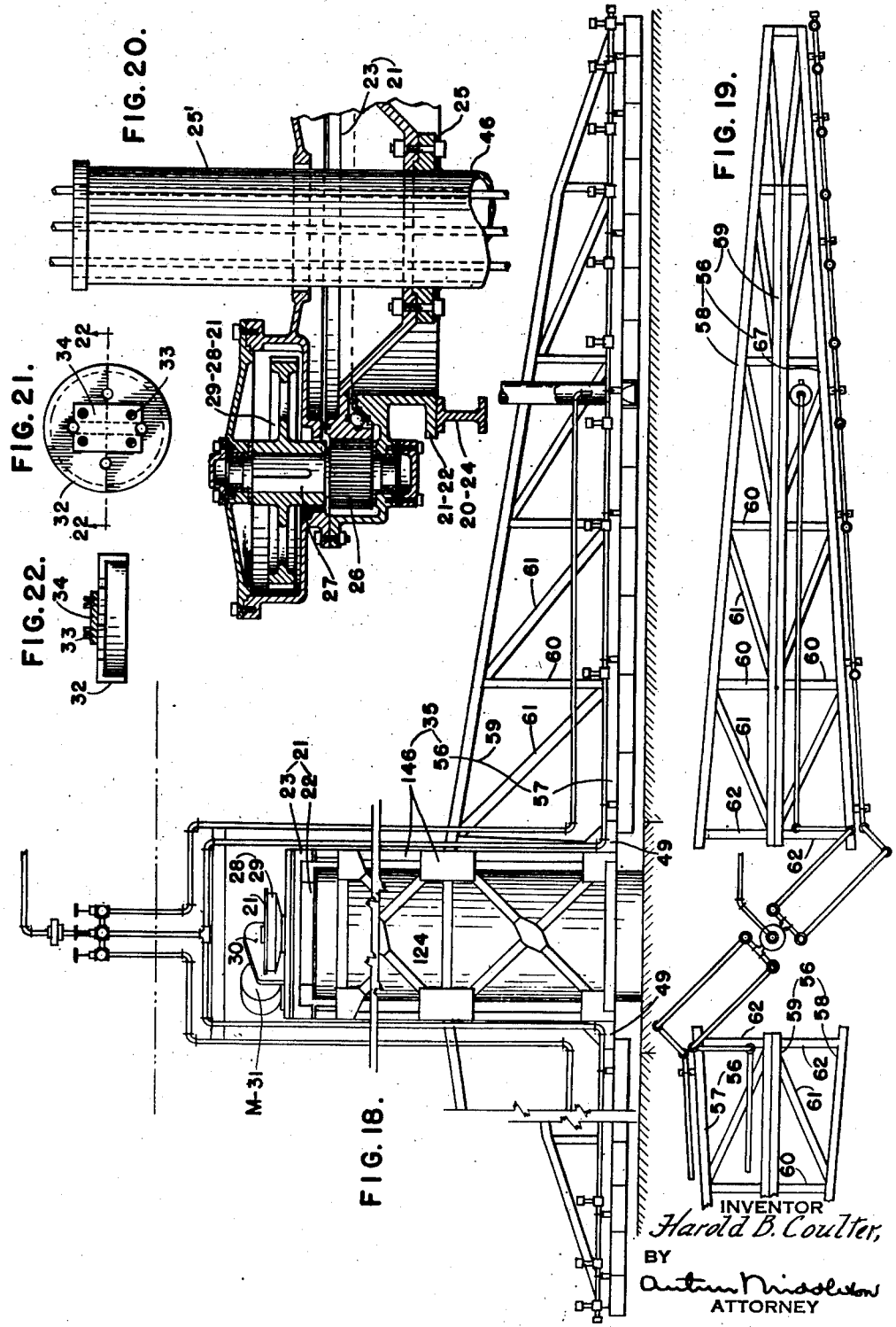

Patented Jan. 4, 1949

2,458,061

UNITED STATES PATENT OFFICE 2,458,061

SLURRY MIXER

Harold B. Coulter, Larchmont, N. Y., assignor to The Dorr Company, New York, N. Y., a corporation of Delaware Application July 12, 1947, Serial No. 760,684

7 Claims. (Cl. 261—93)

This invention relates to tanks in which solids-liquid mixtures are made into slurries that are of the type usually known as slurry mixers. Such mixers are used in a number of industries but in the cement industry there is a demand for making such mixers in heretofore abnormal diameters. The larger the diameter of the mixer, the more difficult it becomes to maintain the mixture well slurried.

In such mixers, it is customary to cause mixing agitation of the slurry components by means of air-diffusing nozzles mounted on air-supplying arms movable in horizontally-extending paths adjacent the bottom of the mixer tank. Air diffusedly emitted from these travelling nozzles in rising through the body of slurry through which they move tends to keep the slurry components well mixed due to the vertical agitation effected thereby but such mixing only takes place within a rather limited range of such nozzles. Therefore, as a slurry mixer is made larger in diameter, it is impracticable to use enough diffuser nozzles to maintain homogeneity of admixture with the result that a certain amount of sedimentation or settling of solids takes place in zones of minor agitation between adjacent nozzles. In other words, while such solids are maintained in suspension in a zone around a nozzle reached by the agitation caused by its emitted air, there are zones of relative quiescence between adjacent nozzles where diminished effectiveness of the agitation allows solids to settle. Accordingly, it is one object of this invention to devise apparatus for accumulating and concentrating settled solids into an annular collecting space followed by sucking such concentrated settled solids from the bottom of the tank and lifting them to adjacent the liquid-level of the body of slurry so that they are again rendered into suspension and re-subjected to agitation, whereby there is insured functional homogeneity of admixture of the components being slurried in large tanks without requiring an uneconomic number of air-diffusing nozzles and in spite of settling of some solids in relatively quiescent zones between nozzles that are out of reach of effective agitation therefrom.

This object is attainable in a body of slurriable components retained or detained in a tank that has air-diffusing nozzles carried by air-supplying arms movable above the tank bottom, by the combination (1) of sediment-raking blades movable in closed paths over and along the tank bottom so arranged that sediment in a zone nearer to the axis of the tank is raked or impelled outwardly while sediment in an annular zone farther from the axis of the tank is raked or impelled inwardly whereby sediment from both zones is accumulated and concentrated in an annular sediment-receiving space substantially medially disposed on the tank bottom, and (2) of open-ended lift pipes, sometimes referred to herein as air-lift tubes, extending from adjacent the tank bottom to adjacent the liquid-level of the slurry body and movable through the slurry in closed paths adapted to suck and elevate sediment from the tank bottom to discharge it submergedly from the top of the lift pipe. The sucking and elevating of the sediment is accomplished by an air-jet emitting air into slurry in the lift pipe under conditions that air-bubbles are formed therein which in rising in the tube act like a pump to raise sediment from the tank bottom to be discharged from the top of the lift pipe into the range of effective action of the agitative forces set up by the moving air-diffusing nozzles. Thus, instead of as heretofore attempting by a sufficient number of zones of vertical agitation to keep all of the solids in suspension, this invention is based upon the principle of intentionally providing between the zones of vertical agitation some zones of relative quiescence wherein solids are permitted to settle to form sediment on the bottom of the tank; collecting and concentrating such sediment raked into an annular zone on the tank floor; and then re-suspending such concentrated sediment by travelling air-lift means into the reach of the zones of agitation—thereby effecting efficient slurry mixing in very large tanks.

In the preferred form of the invention there are also employed branch air lines having multi-ports or multi-apertured horizontally-extending pipe sections each carried by a rake arm to which it corresponds for dispersingly delivering pressure air from radially spaced air delivery nozzles with which said horizontal pipe section is equipped for thus providing specific means by and from which horizontally spaced air streams are submergedly delivered into and along lower interior portions of the tank.

More detailed features of the invention include scoops carried by the lower portion of the lift pipes for scooping up the raked and concentrated sediment into the mouth of the pipes to be in effective reach of the air-lifts in the pipes.

However, as the foregoing described the concept of the invention rather than its scope, the claims should be referred to for the metes and bounds of the invention.

Other features or aspects of the invention hereof will more fully appear and be appreciated from the description which follows particularly when considered in conjunction with the accompanying drawings which constitute a part of the specification.

In those drawings Figs. 1 and 2 are respectively plan and vertical sectional views of a slurry mixing apparatus for realizing the invention hereof.

Figs. 3, 4 and 5 are views relating to certain details of construction employable in the apparatus of Figs. 1 and 2.

Figs. 6 and 7 are respectively vertical and plan views—partially broken away—illustrating outwardly-extending rake-carrying arms, turnable means by which said arms are carried so as to have horizontal turning movement about a vertical axis, rising lift pipes supported from and carried by intermediate portions of said arms, and for the inner and outer portions of the arms there are arranged or disposed horizontally-spaced air-distributing nozzles. In these figures there is indicated an air-supply means embodying a stationary pressure-air line, a swivel pipe connection having a fixedly positioned member and a turntable branching member from which there extend valve-controlled branch lines, some of which branches deliver air into the rising lift pipes, while other branches deliver air through a horizontally-extending multi-ported pipe section into and from horizontally spaced air distributing nozzles.

Figs. 8, 9 and 10 illustrate how the valve-controlled branch pipe lines of said air-supply means are assembled and supported in position with respect to the turnable means and by which the rake-carrying arms are supported and carried.

Fig. 11 is a detail of an air-distributing nozzle heretofore referred to.

Figs. 12 and 13 are respectively a front and a side or radial view of a lift pipe and associated functioning parts thereof—in Fig. 12 certain parts are broken away.

Figure 1:
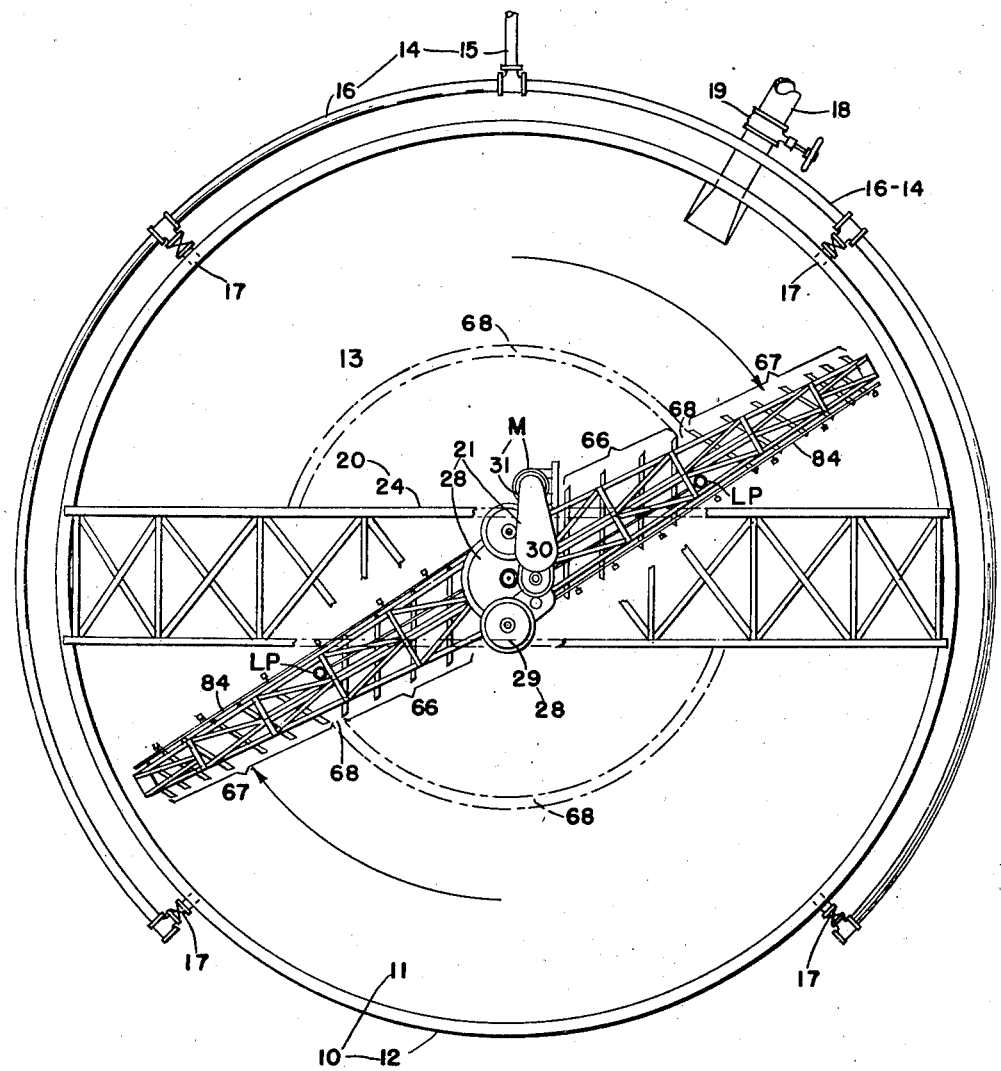

Figs. 14, 15 and 16 are views respectively taken on horizontal planes indicated by the broken lines 14—14, 15—15 and 16—16 of Fig. 12 looking in the direction of the arrows.

Fig. 17 is a plan view of the upper end portion of a lift pipe without any showing of the flat plates appearing in Figs. 12 and 13.

Figs. 18 and 19 illustrate by vertical and plan views a modified form of construction employable for and usable in the realization of invention.

Fig. 20 illustrates by a partial vertical sectional view a portion of a center driving mechanism by and from which a turnable drive tube or turnable arm-carrier supports the rake-carrying arms and branching air supply pipe line which are turnable therewith.

Figs. 21 and 22 are plan and vertical sectional views of a drive tube cover that is constructed whereby the branch pipe line or pipes can extend downwardly through the cover and within the upper end portion of turnable drive tube.

Reference is now made to the drawings in detail:

The tank or basin is designated 10 and provides a floor or bottom 11 from which there rises a marginal wall or wall portions 12 whereby there is provided a slurry-body holding or retaining section 13 into the upper portion of which there is supplied as through the medium of a feed piping or other suitable feeding means 14 in a liquid-solids mixture which it is desired to establish into and maintain as an intimate mixture in fluid or slurried condition and which mixture can be withdrawn as a slurry from the tank or basin either as part of a continuous process or according to operative requirements when batch operations are employed.

As shown the feed piping 14 has a main supply line 15, branch feed pipe sections 16—16 and feed-discharge sections 17—17 leading from each branch pipe section 16. These feed-discharge sections 17 are horizontally spaced and deliver the supplied feed material at outer peripheral localities within the upper interior portion of the tank.

The tank has a valve or gate controlled slurry withdrawal pipe or discharge conduit 18 leading from the lower interior portion of the tank and by which slurry is passed or discharged from the tank as when the valve or gate at 19 is open.

A superstructure or other suitable form of support 20 is fixedly positioned with respect to the tank and is provided for functioning as a fixed carrying support for a center mechanism 21 (see Figs. as 2, 6, 18 or 20) that provides a turntable base 22 upon which there is mounted a turntable 23 in the form of a bull gear, ring or wheel which when actuated has turning movement imparted thereto about a vertical axis which is substantially concentric or centrally disposed with respect to the marginal wall 12, the latter of which is preferably but not necessarily circular in plan.

In the form of apparatus of Figs. 1, 2 and 6 the fixedly positioned support 20 is provided by a truss 24 carried by and from the marginal wall 12 of the tank. In the form according to Fig. 18 the fixed carying support 20 is provided by a pier or column 124 rising from the tank bottom and upon the upper end of this pier there is carried the turntable base 22 of the center mechanism 21. In connection with the foregoing, Fig. 20 is quite pertinent since therein there is illustrated by a partial vertical sectional view, a portion of a typical form of center mechanism 21 which may be referred to as a motivated driving mechanism by and from which there is supported and actuated a rake-arm carrying member having a depending shaft portion through the medium of which rake arms are carried and driven for turning movement about a vertical axis. A center mechanism of this general type for supporting and driving the rake-arm carrying member is old and well-known.

In the instance of the present invention outwardly- or radially-extending rake arms are employed which are carried from the lower portion of said shaft, such arms, however, are specially constructed and provided with other parts operatively associated therewith whereby they constitute an essential part or component of a novel slurry agitating and maintaining mechanism collectively designated 35.

The center mechanism as illustrated in the partial sectional view by Fig. 20 is quite typical of the central mechanism 21 employed or employable in and by the apparatus of the present invention. By this Fig. 20 it will be noted that the turntable or bull gear 23 thereof is driven by a spur or pinion gear 26 that is secured to a vertically-extending base pinion shaft 27 upon which there is a larger power-transmission gear 29 that constitutes part of a speed-reducing power-transmission gearing or mechanism 28. The center mechanism 21 of either Fig. 2 or Fig. 18 preferably includes the speed-reducing power-transmission mechanism 28 just referred to or the equivalent thereof and is motor-actuated as through the medium of speed-reducing and beltdrive mechanism generally designated as 30 that is actuated from the rotor 31 of a drive motor M.

The slurry agitating and maintaining mechanism generally designated as 35 comprises a depending arm-carrying member or rake arm carrier, which is sometimes referred to and which is generally designated as 46 in Figs. 2, 3, 4 and 6, or as 146 in Fig. 18 and from the lower portion of which rake arms generally designated as 56 extend radially outwardly therefrom into a region proximate that of the interior of the rising marginal wall of the tank. Each of these arms is suitably connected to the depending carrying member therefor, for example, the arms 56 of Figs. 2, 6 and 7 are connected to the corresponding carrier generally designated 46 through the medium of an arm-spider construction and other connecting elements illustrated by Figs. 3 and 4 of which the details will later be described. Depending carrier 46 functions as a torque drive tube.

The lowermost end portion 47 of the depending arm-carrying shaft 46 is guided by a steady bearing construction shown in Figs. 4 and 5, the details of which parts will later be described.

Rake-carrying arms generally designated as 56 and which are carried by a depending carrying member as 46 or 146 just mentioned and illustrated by the figures hereof are provided by structural members that include a lower front chord or longitudinal 57, a lower rear chord or longitudinal 58, and the upper chord or longitudinal 59 that approach each other in passing radially outwardly and these chords or longitudinals are connected by struts, braces, or tie members such as 60, 61 and 62 into a triangular arrangement whereby a relatively stiff arm construction is realized.

In so far as this present invention is concerned, however, these arms can be built in any suitable formation. From the lower portion or underside of these arms there downwardly extend raking blades or raking elements embodied in or providing an inwardly disposed set 66 and an outwardly disposed set 67 of raking blades. These arms 56 are connected in any suitable manner to the depending carrier therefor.

The lower portion of the inner ends of the arms are relatively wide or large as compared with the outside diameter of the hollow drive tube or drive shaft 46 of Fig. 2 and therefore an intermediate spacer member or spider 48, to wit, as shown in Fig. 3, is provided at and for the lower end of the shaft 46 as part of a rigid connecting member thereat and to which the lower inner end portions of the arms 56 are connected as by connecting plates 49—49. Also in the instance of Fig. 2 the upper longitudinal or chord 59 of each arm 56 in connected in any suitable manner to an upwardly disposed portion of the shaft or drive tube 46 as by a connecting member or plate 50.

In the case of Fig. 2 the lowermost portion 47 of the hollow shaft or drive tube 46 continues to extend downwardly substantially to the bottom of the tank and the steady bearing construction of Figs. 4 and 5 is provided whereby the drive tube 46 is maintained in proper alignment with respect to the vertically-extending axial line. From these figures it will be noted that a base plate member 51 is secured to the bottom of the tank. It has thereupon guide blocks 52 preferably of wood, and block-position and holding means generally designated 53 for holding in position the wooden guide blocks 52 that are provided for guidedly engaging a guided ring member 55 disposed at and on the lower end portion 47 of the depending tube or shaft 46.

As already indicated important aspects of the invention hereof revolve about that which may be viewed as a novel form of mechanism for agitating a slurry providing liquid solids mixture in a manner effective for establishing and maintaining a mixture in true slurry condition in that the solids content of the mixture is relatively uniformly distributed and dispersed within and throughout the liquid medium of the mixture.

In this connection it is here pointed out that the mechanism just referred to and collectively designated as 35 may be considered as a slurry agitating and slurry mixing mechanism. This mechanism as constructed embodies as already mentioned motor driven turntable or motor actuated bull gear 23 which is movably mounted on the turntable base 22 that is stationarily mounted on the support truss 24 of Fig. 2 or the rising pier or column 124 of Fig. 18 and whereby as the turntable is driven it moves in a clockwise direction about a vertical axis substantially concentric with the marginal wall of the tank.

In the instance of the form of mechanism shown in Figs. 2, 6 and as amplified by Fig. 20, it will be noted that this mechanism 35 embodies the heretofore mentioned arm-carrying shaft or drive tube 46. This drive tube 46 has a carrying and rigid connection at 25 to the bull-wheel or gear 23 from and by which it is turnably driven about said vertical axis. This drive tube 46 has a depending portion from a lower part of which the rake arms 56 are carried and outwardly extend, and also a rising portion 25' extending upwardly through and from the bull gear 23 thereby providing a support and also a receiving space or portion of descending valve-controlled air pipes or branch lines 81 and 83 of a pressure air supply system 76 and of which the branch line 81 leads into lift tubes or pipes LP which are carried by the rake arms 56, while line 83 terminates in horizontally-extending multi-apertured pipe sections 84 provided with air delivery nozzles 85 and whereby pipe sections 84 are carried by and are located at and along the forward lower portion of the rake arm to which it corresponds. The several parts just referred to constitute important functioning parts or members of the slurry agitating and slurry mixing mechanism particularly when considered in conjunction and operative relationship with respect to the sets of raking blades arranged and functioning as herein described.

The details of construction of this rising section 25' and the manner in which the branch pipes 81 and 83 are associated therewith and carried thereby are shown in detail by Figs. 9 and 10, while the capping portion or member for this upward extension is shown in detail in Figs. 21 and 22 and will be later described.

Digressing for the moment, it will here be further pointed out that with respect to the disposition and functioning of the raking blades carried by and extending downwardly from each rake arm, it will be further noted (a) that the raking blades of the inwardly disposed set horizontally slant rearwardly and outwardly for raking and progressively impelling solids material toward and into medial annular floor region or section 68, and (b) that the raking blades of the outwardly disposed set horizontally slant rearwardly and inwardly for raking and progressively impelling sedimented material towards and into said medial floor region or section 68. In this connection it will also be noted that the outermost end raking blade of the inwardly disposed set and the innermost end raking blade of the outwardly disposed set approach each other—with a short space left between them—whereby the said end blades just mentioned approximately define and determine the inner and outer limits of the medial annular floor region or section 68 referred to. As will hereinafter appear a lower end or shovel portion of each lift pipe LP extends immediately over or into the medial annular floor region or section 68 and rises therefrom while the apertured or nozzled portions of horizontally-extending pipe sections 48 provide means for progressively releasing air over and above the diverse portion of the inlying and outlying floor portions that are markedly defined by the medial annular floor region or section which is located intermediate or between them.

As part of said slurry agitating and maintaining mechanism 35 there is included the pressure air-supply system or air-distributing means generally designated as 76 of which the pressure air for said distributing means is supplied from a fixed pressure line 77 through a swivel coupling 78 embodying a fixed member 79 and a turnable multiple distributing head 80 from which head there extend four valve-controlled pipe sections or branch lines 81—81 and 83—83 in which two of said branch lines 83—83 have horizontally-extending multi-ported distributing pipe sections 84—84 carried by and at the forward lower portion of a rake arm 56 corresponding thereto. The horizontal sections 84 just referred to are provided with horizontally spaced air nozzles 85 from which air passing therefrom is distributingly delivered into the lower portion of the slurry mixture as the arms turn about the vertically-extending axis therefor. The horizontal spacing between the air nozzles preferably decreases in passing from the center of the tank outwardly toward the wall of the tank.

The branch lines 81—81 lead to and have discharge terminal tips 82—82 from which there is downwardly delivered pressure air into the lift pipes LP corresponding thereto. The lift pipes LP are carried by and move with the rake arms and are arranged whereby they serve as a pumping means for lifting solids which are either shovelled into or sucked into the lower end of the lift pipe and from which the air lifted solids are submergedly delivered as pumped solids into the upper portion of the slurry bed within the tank. Each lift pipe LP has a tubular body 90, a shovel or scoop section provided at and for the lower portion thereof of which an upwardly and rearwardly slanting floor plate or shovel bottom 91 extends from a location near the tank floor, to wit, from a region below the rake arms whereby to shovel, scoop or lift solids from within the medial annular floor section or region 68 and to deliver the scooped solids into the tubular body section 90. To aid in this scooping operation shovel side members 92 are provided which also serve as a means for connecting the shovel bottom rigidly in place with respect to the tubular body. The forward portion of the lift pipe body is cut away at 93, or as otherwise expressed, the lower forward end portion of the body member is chamfered or cut out to provide a downwardly and rearwardly-extending cut section terminating at a locality 94 preferably slightly behind a horizontally-extending diagonal line at the bottom of the body member. Above the shovel bottom and because of the cut away portion just referred to, there is provided or left a passage area at 95 for permitting the transfer of scooped or shovelled solids into the lift pipe. The shovel bottom terminates ahead of the rearmost inner portion of the lower end of the lift pipe whereby to provide or leave a sucking up passage area at 96. Pumping air is delivered from the terminal tips 82 within the lift pipe whereby air delivered from said tips forms or provides a series of bubbles which by progressively rising movement within the lift pipe and which rising bubbles provide energy effective for lifting both scooped and sucked solids and for submergedly delivering the thus pumped solids from the upper portion of the lift pipe, a quantity of the thus lifted solids is also submergedly delivered through a laterally-extending discharge tube 97. All of the thus pumped solids material is delivered into the upper portion of the sludge body within the tank. Each lift pipe is of large interior dimension as compared with the exterior diameter of the terminal nozzle or descending tip portion 82 of the air branch line 81. Thusly the air delivered from the terminal tip 82 forms into a series of enlarged lift bubbles which as they progressively rise within and pass from the liquid tube function as already indicated to lift and pass solids into the slurry body portion above and outside of an upper portion of the lift pipe. Each lift pipe is provided with securing members or connecting plates 98 or tabs as 99 through the medium of which each lift pipe is effectively secured in place to and upon the rake-carrying arm to which it corresponds.

As to the horizontally spaced air distributing nozzles 85 with which the horizontally-extending branch pipe section 84 is equipped, each nozzle or air-distributing cap as member 85 may be called, has a short rising pipe section 86, a reducing pipe member 87, an apertured cap 88 having a screw connection to the reducing pipe member 87, a porous plate 89 and annular rubber gaskets 89′ and 89″ whereby the porous plate is clamped in place between yieldable material interposed between the porous plate on the one hand and the overlying aperture cap 88 and the reducing pipe 87 on the other hand.

Figs. 9 and 10 are respective sections taken as on horizontal planes indicated by dot-and-dash lines 9—9 and 10—10 looking downwardly in the direction of the arrows. These figures show how the sections of the valve controlled branch air pipe sections 81—81 and 83—83 extend outwardly and downwardly within the rising or upper portion 25′ of the vertically-extending drive tube or shaft 46, thence outwardly through corresponding openings 41—41 and 43—43 to the exterior of and downwardly along the exterior portion of the vertically-extending drive tube. Said externally located portions of the descending branch pipe line sections 81—81 and 83—83 are supported by connecting means 38 shown in Fig. 10 which are provided by outwardly and vertically-extending tab members 39, bolts 40, plates 42 and U-shaped clamping bolts or members 44. By these means the depending branch pipe sections are rigidly secured in place with respect to the descending drive tube or shaft 46 whereby these depending pipe sections or branches turn with the drive tube or rake arm carrier 46 and the rake arms and other members associated therewith.

Figs. 21 and 22 in connection with Figs. 6 and 20 illustrate how a cap construction is provided at or for the top of the rising tube section 25′ whereby the descending branch pipe sections 81—81 and 83—83 enter the rising tube section 25'. These figures show a cap member or construction of which split members 32 thereof are shaped and constructed so as to be assembled in place after the branch pipe sections are in their location and how these split cap members connected into a final cap construction providing four holes through which the descending air pipe sections extend and which cap sections are secured and connected to each other through the medium of a securing element or flat plate 34 held in place as by screws or bolts 33.

In the instance of Figs. 18 and 19 the depending cage 146 is of relatively rigid construction and is so connected to and carried from the turnable bull gear or ring 23 that a guiding element for or at the lower end of said cage is not necessary.

Also in the case of the form of mechanism of said Figs. 18 and 19 the air supply system and more specifically the upper and depending portions of branching air pipe line are all located outside of viz. above and outside of center mechanism 21 the motivated mechanism associated therewith.

In forms of construction typified by Figs. 2 and 6 and by Figs. 18 and 19 the valve-controlled branch lines are supplied with pressure air from a fixed air line section 77 through the medium of a swivel type of pipe connection 78 providing a branching type of turnable portion as 80 having valve-controlled branch lines of which some provide horizontally-extending multi-ported discharge suction 84 carried by and extending along the rake arms to which they correspond while other of said valve-controlled branch lines as 81 lead into and provide tips 82 located within the lift pipes LP on and carried by the rake arms.

The apparatus of Figs. 18 and 19 functions substantially the same as the apparatus illustrated by Figs. 1, 2, 6 and 7 particularly as to the arrangement of the rake arms that move about a vertical axial line over and along the tank floor or bottom; the arrangement of the inner and outer set of raking blades and the functioning and arrangement of the air-lift pipe LP and the air-distributing pipe branches 84 with air-flow distributing nozzles 85, whereby the fundamental novel arrangements of the parts are attained.

The apparatus hereof is designed for accomplishing and realizing a novel mode of associated operations for effecting the establishment of a true slurry mixture of finely divided solids in a liquid medium and an important aspect of the invention may therefore also be viewed as revolving about a novel method involving the confinedly retaining of a body of liquid-solids mixture which is to be established or maintained in an effective slurry condition by therein carrying out progressive raking of sediment or solids existing in the lower but inwardly disposed portion of said body and with respect to said first-mentioned raked solids progressively impelling the same outwardly towards and into a medial annular collecting region and corresponding progressive raking of sediment or solids existing in the lower but outwardly disposed portion of said body and with respect to said last-mentioned solids progressively inwardly impelling the same into said medial annular collecting region; air-lifting and pumping of raked and impelled solids from within said medial annular region and submergedly delivering the air-lifted and air-pumped solids into the upper portion of said body; progressively air-agitating of liquid solids mixture constituting said body by distributingly delivering air streams or air bubbles within the lower portion of the body at locations both inwardly and outwardly disposed with respect to said medial annular region.

More specifically, the raking and impelling of sedimented material is effected by forces progressively applied to the sedimented solids at and along circular paths and within the lower portion of the confined body-providing liquid-solids mixture or slurry; scooping or shovelling certain quantities of solids from within the medial annular region into and under the pumping or lifting influence of the air-lifting medium and during this operation carrying out a progressive delivery of the pumping or lifting air in circular paths above or along the medial annular region, and furthermore, releasing the aforementioned air streams or air bubbles at and along circular pathways within the lower portion of said body and concentric with said medial annular region.

Slurry mixtures established within the body which is confinedly held within the tank can be established or maintained by the operative step just described. The slurry condition thus established can be maintained for use as desired, to wit, as a desired slurry for use in or as part of a batch operation or as a slurry progressively established and maintained for use in and as part of a continuous process.

I claim:

1. Apparatus of the class described, comprising in combination a slurry mixing and holding tank having a relatively flat bottom with marginal wall rising therefrom, a draw-off conduit leading from the lower interior portion thereof, and equipped with motivated sediment-raking and impelling mechanism operable over and progressively along diverse sections of the floor of the tank; said apparatus being characterized in that the motivated sediment-raking and impelling mechanism includes outwardly-extending rake-carrying arms turnable about a vertically-extending axis and of which (1) each rake-carrying arm is equipped with downwardly-extending bladed elements arranged in sets including (a) an inlying set on the inner portion of its arm of which the bladed elements extend rearwardly and outwardly and function to impel sediment engaged thereby progressively forwardly and outwardly towards and into an annular medial band section on and above the floor of the tank, and (b) an outlying set on the outer portion of the arm of which the bladed elements extend forwardly and outwardly and function to impel sediment engaged thereby forwardly and inwardly towards and into said annular medial-band section; (2) each rake-carrying arm has a vertically-extending lift pipe carried thereby and rising from the general region where the outer end portion of the inlying set and the inner end portion of the outlying set of raking blades approach each other; and (3) each rake-carrying arm has movable therewith an air supply pipe connected for receiving pressure air received thereinto and for delivering air therefrom into the interior of the corresponding lift pipe.

2. Slurry mixing apparatus comprising in combination a slurry mixing and retaining tank having a circular bottom with marginal wall rising therefrom, a draw-off conduit leading from the lower interior portion of said tank, supporting means fixedly positioned with respect to the tank, a motivated sediment-raking and impelling mechanism mounted on said supporting means so as to have horizontal turning movement about a vertically-extending axis and having outwardly-extending rake-carrying arms equipped with bladed elements repetitively operable over and along diverse sections of the floor of the tank in closed circular paths as said mechanism has forward turning movement about said axial line; said apparatus being characterized in that (1) the bladed raking elements of said carrying arms are constructed and arranged to provide (a) inwardly disposed sets of raking elements of which the raking elements extend rearwardly and outwardly and (b) outwardly-disposed sets of raking elements of which the raking elements extend forwardly and outwardly whereby consequent to forward movement of the mechanism said inwardly-disposed sets and said outwardly-disposed sets function respectively to progressively impel settled solids forwardly and outwardly and forwardly and inwardly into a medial annular floor section that is located in the region intermediate but underlying the approaching and proximate end portions of the aforementioned inwardly disposed sets of raking elements on the one hand and the outwardly-disposed sets of raking elements on the other hand; in that (2) there is a lift pipe for and carried by each arm and extending upwardly from the region between and determined by the proximate end portions of said inwardly-disposed and said outwardly-disposed sets of raking elements; and in that (3) there are means for supplying air therefore into a lower portion of each of said lift pipes.

3. Slurry mixing apparatus comprising in combination a slurry mixing and retaining tank having a circular bottom with marginal wall rising therefrom, a draw-off conduit leading from the lower interior portion of said tank, supporting means fixedly positioned with respect to the tank, a motivated sediment-raking and impelling mechanism mounted on said supporting means so as to have horizontal turning movement about a vertically-extending axis and having outwardly-extending rake-carrying arms equipped with bladed elements repetitively operable over and along diverse sections of the floor of the tank in closed circular paths as said mechanism has forward turning movement about said axial line; said apparatus being characterized in that (1) the bladed raking elements of said carrying arms are constructed and arranged to provide (a) inwardly-disposed sets of raking elements of which the raking elements extend rearwardly and outwardly and (b) outwardly-disposed sets of raking elements of which the raking elements extend forwardly and outwardly whereby consequent to forward movement of the mechanism said inwardly-disposed sets and said outwardly-disposed sets function respectively to progressively impel settled solids forwardly and outwardly and forwardly and inwardly into a medial annular floor section that is located in the region intermediate but underlying the approaching and proximate end portions of the aforementioned inwardly-disposed sets of raking elements on the one hand and the outwardly-disposed sets of raking elements on the other hand; in that (2) there are vertically-extending lift pipes carried by the arms and rising from the medial annular floor section into which the sedimented solids are impelled by said inwardly-disposed and said outwardly-disposed sets of raking blades; and in that (3) there are valve-controlled pipe lines provided for supplying air therefrom into the lower portions of said lift pipes.

4. Apparatus according to claim 2, in which, for each rake arm, there is a valve-controlled air supply pipe line secured to and movable therewith, and spaced series of air delivery nozzles connected for receiving air from said supply pipeline and submergedly delivering air into the slurry mixture within the tank.

5. Apparatus according to claim 2, in which each lift pipe is open throughout its length and has at the lower portion thereof a forwardly and downwardly-extending shovel in the form of a scoop, the lower forward end of which shovel is at elevation approximate that of the lowermost portion of the raking blades.

6. Apparatus according to claim 2, in which each lift pipe is equipped with a scoop providing an upwardly and rearwardly-extending shovel surface arranged for delivering sedimented material thus lifted by the shovel section into and through a forward opening at the front end of the lift pipe; which lift pipes each have a continuously open passageway section within the lower portion thereof and immediately behind the shovel section through which an upwardly pulling suction operates.

7. Apparatus according to claim 2, in which each lift pipe has a scoop providing an upwardly and rearwardly extending shovel surface arranged for delivering sedimented material thus lifted thereby into the lower front end of the lift pipe and in which there is also left at the lower end of the lift pipe an unobstructed lift opening between the rearmost portion of the shovel section and the lower interior portion of the tube at the rear of said shovel section.

HAROLD B. COULTER.

REFERENCES CITED

The following references are of record in the file of this patent:

UNITED STATES PATENTS

| Number | Name | Date |
| --- | --- | --- |
| 1,832,469 | Neill et al. | Nov. 17, 1931 |
| 2,077,445 | Wallace et al. | Apr. 20, 1937 |
| 2,239,194 | Fitzgerald et al. | Apr. 22, 1941 |
| 2,322,720 | Scott et al. | June 22, 1943 |

FOREIGN PATENTS

| Number | Country | Date |
| --- | --- | --- |
| 17,383 | Great Britain | Dec. 11, 1916 |